United States Patent
Phatak

(10) Patent No.: US 8,065,107 B1
(45) Date of Patent: Nov. 22, 2011

(54) COMBINATORIAL PROCESS OPTIMIZATION METHODOLOGY AND SYSTEM

(75) Inventor: Prashant B. Phatak, San Jose, CA (US)

(73) Assignee: Intermolecular, Inc., San Jose, CA (US)

(*) Notice: Subject to any disclaimer, the term of this patent is extended or adjusted under 35 U.S.C. 154(b) by 688 days.

(21) Appl. No.: 12/248,850

(22) Filed: Oct. 9, 2008

(51) Int. Cl.
*G01L 15/00* (2006.01)
(52) U.S. Cl. .................................................. 702/123
(58) Field of Classification Search .................. 702/123
See application file for complete search history.

(56) References Cited

U.S. PATENT DOCUMENTS

2003/0054740 A1* 3/2003 Mansky ................... 451/57
* cited by examiner

*Primary Examiner* — Aditya Bhat

(57) ABSTRACT

A method for obtaining an optimized process solution from a set of design of experiments in a cost effective manner is provided. An actual experiment is performed and data from the experiments is obtained. Through statistical analysis of the data, coefficients are obtained. These coefficients are input into an experiment simulator where input parameters and conditions are combined with the coefficients to predict an output for the input parameters and conditions. From simulated results, conclusions can be drawn as to sets of input parameters and conditions providing desired results. Thereafter, physical experiments utilizing the input parameters and conditions may be performed to verify the simulated results.

20 Claims, 10 Drawing Sheets

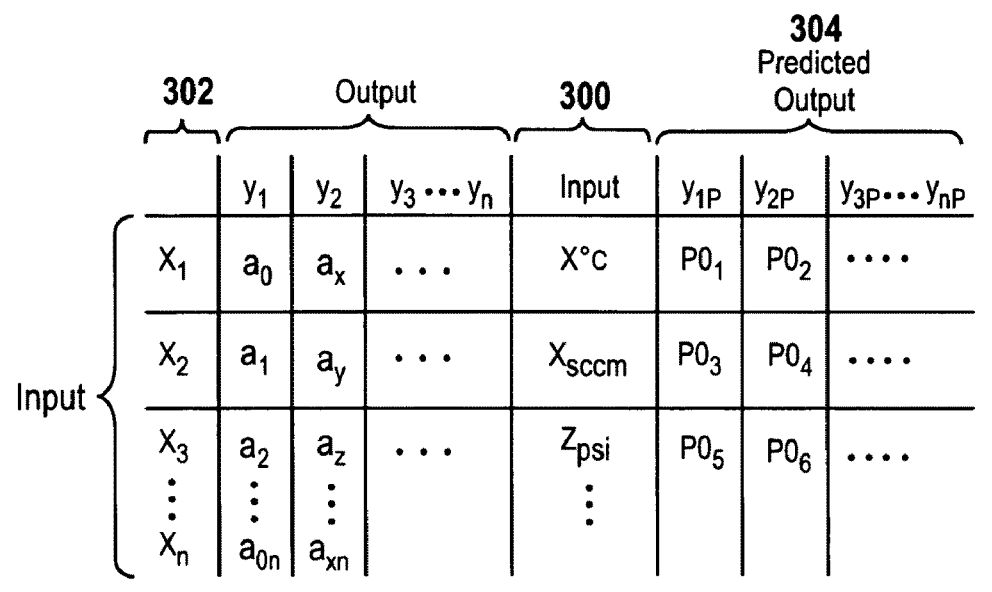

| | 302 | Output | | 300 | 304 Predicted Output | | |
|---|---|---|---|---|---|---|---|
| | | $y_1$ | $y_2$ | $y_3 \cdots y_n$ | Input | $y_{1P}$ | $y_{2P}$ | $y_{3P} \cdots y_{nP}$ |
| Input { $X_1$ | $a_0$ | $a_x$ | ... | $X°C$ | $PO_1$ | $PO_2$ | .... |
| $X_2$ | $a_1$ | $a_y$ | ... | $X_{sccm}$ | $PO_3$ | $PO_4$ | .... |
| $X_3$ | $a_2$ | $a_z$ | ... | $Z_{psi}$ | $PO_5$ | $PO_6$ | .... |
| $\vdots$ | $\vdots$ | $\vdots$ | | $\vdots$ | | | |
| $X_n$ | $a_{0n}$ | $a_{xn}$ | | | | | |

FIG. 3A

COMBINATORIAL PROCESS OPTIMIZATION METHODOLOGY AND SYSTEM

BACKGROUND

The manufacturer of the integrated circuits (IC) semiconductor devices, flat panel displays, optoelectronics devices, data storage devices, magneto electronic devices, magneto optic devices, package devices, and the like entails the integration and sequencing of many unit processing steps. For example, IC manufacturing typically includes a series of processing steps such as cleaning, surface preparation, deposition, lithography, patterning, etching, planarization, implantation, thermal annealing and other related unit processing steps. The precise sequencing and integration of the units processing steps enables the formation of functional devices meeting desired performance specifications such as speed, power consumption, yield and reliability. Furthermore, the tools and equipment employed in device manufacturing have been developed to enable the processing of ever increasing substrate sizes such as the move to larger diameter wafers in order to fit more ICs per substrate per unit processing step for productivity and cost benefits. Other methods of increasing productivity and decreasing manufacturing costs include the use of batch reactors whereby multiple monolithic substrates can be processed in parallel. In these processing steps the entire monolithic substrate or batch substrates are processed uniformly, i.e., in the same fashion with the same resulting physical chemical, electrical, and the like properties across the monolithic substrate.

The ability to process uniformly across the entire monolithic substrate and/or across a series of substrates is advantageous for manufacturing costs and effectiveness as well as repeatability and control. However, processing the entire substrate can be disadvantageous when optimizing, qualifying or investigating new materials, new processes, and/or new process sequence integration scheme, since the entire substrate is nominally made the same using the same materials, processes and process sequence integration scheme. Thus, the full wafer uniform processing results in fewer data points per substrate, longer times to accumulate a wide variety of data and higher costs associated with obtaining such data.

Accordingly, there is a need to be able to more efficiently screen and analyze an array of materials, processes, and process sequence integration schemes across a substrate in order to further enhance the semiconductor manufacturing process.

BRIEF DESCRIPTION OF THE DRAWINGS

The present invention will be readily understood by the following detailed description in conjunction with the accompanying drawings, and like reference numerals designate like structural elements.

FIG. 3A is a simplified schematic diagram illustrating a table of coefficients utilized to provide predicted results in accordance with one embodiment of the invention.

DETAILED DESCRIPTION

Figure 1:
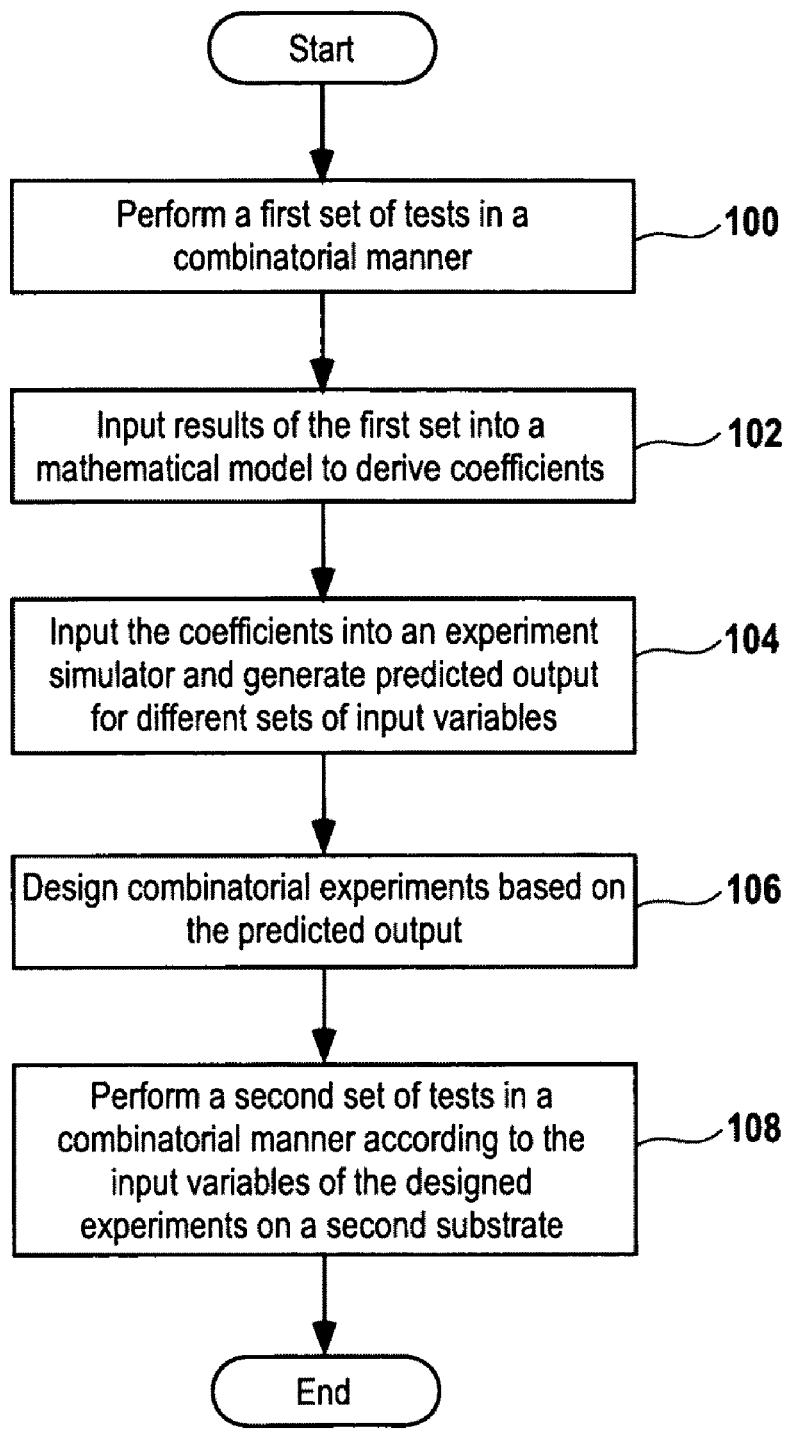
FIG. 1 is a flow chart diagram illustrating the method operations for evaluating materials, unit processes, and process sequences for a semiconductor manufacturing process in accordance with one embodiment of the invention.

The embodiments described herein provide a method and system for efficiently performing combinatorial processing experiments for evaluating semiconductor manufacturing operations. It will be obvious, however, to one skilled in the art, that the present invention may be practiced without some or all of these specific details. In other instances, well known process operations have not been described in detail in order not to unnecessarily obscure the present invention.

The embodiments described herein provide for enhancing a combinatorial processing scheme through the application of factorial design of experiment and/or response surface designs of experiments. In one embodiment, a combinatorial processing scheme is physically performed on a semiconductor substrate. The results of the combinatorial processing are then analyzed in order to provide coefficients derived from model fitting applications. Different input levels are then applied to the mathematical models derived from the previous physical experiment to predict future output for the corresponding input levels. Thus, through the mathematical models, a predicted output is provided so that the combinatorial processing may be more focused and consequently optimized. That is, an optimum process solution that satisfies multiple device, integration and product criteria is derived through the embodiments described below. The predicted output/optimized process solution may then be tested on an actual substrate. The results of the optimized process solution can then be applied to the mathematical models derived from the previous physical experiment in order to further refine future experiments. The embodiments described below may be thought of as an experiment simulator that utilizes statistical analysis to predict output of future combinatorial experiments. It should be appreciated that the combinatorial processing described herein may be applied to any suitable semiconductor manufacturing operation whether a wet chemical operation, such as electrochemical deposition, etc., a dry processing operation such as plasma etch or deposition operations, or cleaning operations.

The method described herein obtains an optimized process solution from a set of design of experiments in a cost effective manner. Initially, an actual experiment is performed where data from the experiments is obtained. Through statistical analysis of the data, coefficients are obtained. These coefficients are input into an experiment simulator where input parameters and conditions are combined with the coefficients to predict an output for the input parameters and conditions. Performing multiple simulations with varied input parameters and conditions provides simulated results thereby avoiding the expense and time of physically performing each of the experiments for the input parameters. From the simulated results, conclusions can be drawn as to sets of input parameters and conditions providing desired results. Thereafter, physical experiments utilizing the input parameters and conditions may be performed to verify the simulated results or to identify optimal results based on the data from the experiments.

FIG. 1 is a flow chart diagram illustrating the method operations for evaluating materials, unit processes, and process sequences for a semiconductor manufacturing process in accordance with one embodiment of the invention. The method initiates with operation 100 where a first set of tests are performed in a combinatorial manner. The first set of tests may vary input variables across regions of a substrate in order to evaluate material properties on the substrate. It should be noted that the first set of tests may be performed by evaluating a series of isolated regions on a substrate through a combinatorial processing tool which may be a wet processing tool or a dry processing tool. In one embodiment, the first set of test may be performed on a single substrate, multiple different substrates, or a combination of the two as further detailed with reference to FIGS. 5A-C.

One skilled in the art will appreciate that the combinatorial processing varies certain materials, unit processes, or process sequences, the composition or thickness of the layers or structures, or the action of the unit process is substantially uniform for each region. It should be noted that the process can be varied between regions, for example, a thickness of a layer is varied, or one or more process parameters, such as a voltage, may be varied between regions, etc., as desired by the design of the experiment. The result of the combinatorial processing is a series of regions on the substrate that contains structures or unit process sequences that have been uniformly applied within that region and, as applicable, across different regions. This process uniformity allows comparison of the properties within and across the different regions such that variations and test results are due to the parameter being modified, e.g., materials, unit processes, unit process parameters, or process sequences, and not the lack of process uniformity. It should be appreciated that the processes performed on the regions in this manner are statistically independent, thereby enabling the employment of the models/simulator disclosed herein in one embodiment.

Returning to FIG. 1, the method then advances to operation 102 where the results of the first set of tests are used to derive coefficients based on statistical analysis. Here, a mathematical model, such as model fitting through statistical analysis software models, may be used to derive the coefficients. In one embodiment, commercially available software packages, such as JMP™ software available from SAS Institute is utilized to derive the coefficients and perform statistical analysis. JMP™ is a computer program developed to perform simple and complex statistical analyses. The program links statistics with graphics to interactively explore, understand, and visualize data. One skilled in the art will appreciate that this allows a user to click on any point in a graph, and see the corresponding data point highlighted in the data table, and other graphs. It should be noted that the model utilizes the fewest variables possible in one embodiment.

The method of FIG. 1 then proceeds to operation 104 where the coefficients are input into an experiment simulator. The experiment simulator consists of mathematical models simulating the experiments. In this operation, the input variables are changed/modified and input into the mathematical models derived from a suitable statistical analysis program in order to generate predicted output for different sets of input variables. It should be noted that a single input variable may be varied or multiple variables may be contemporaneously varied in a similar manner to the actual combinatorial experiments. In one embodiment, the input and/or output parameters are constrained to certain ranges. Thus, some input variable sets may be eliminated when the sets provide output outside of a specified range.

The method then moves to operation 106 where the predicted output is analyzed and a set of combinatorial experiments is designed from this output. That is, the predicted output defines the parameters for a physical set of combinatorial experiments which should verify the results of the experiment simulator. In one embodiment, a graphical illustration of a response surface, such as the graph of FIG. 6, may be generated from the experiment simulator. In another embodiment, the graphical data illustrated in FIGS. 7A and 7B may be generated from simulations. As discussed with reference to FIGS. 6, 7A and 7B, the graphical illustrations may assist in depicting trends or relationships so that future physical experiments may be efficiently designed. It should be noted that the data, such as the data of FIGS. 6, 7A and 7B, enables a user to more effectively design physical experiments in order to arrive at an optimum process for a semiconductor manufacturing operation since the number of physical experiments is reduced through the experiment simulator. The data made available through the simulations may be depicted in other formats and is not limited to the illustrations of FIGS. 6, 7A and 7B.

In operation 108 of FIG. 1, a second set of tests are performed in a combinatorial manner according to the input variables associated with the desired predicted output from the simulations of operation 104. The second set of tests is a set of actual tests performed on a second substrate. Thus, through the embodiments of the above-described method, the second set of tests is optimized for a predicted output in order to focus the combinatorial processing to enhance the speed of converging on a result. In addition, the results of the second set of tests may be compared with the predicted results of the statistical software in order to adjust the mathematical model and corresponding coefficients. Method operations 104 through 108 may be repeated and a third set of tests performed on a third substrate may provide further data to select an optimal combination of processing parameters, sequences, unit operations, etc.

Figure 2:
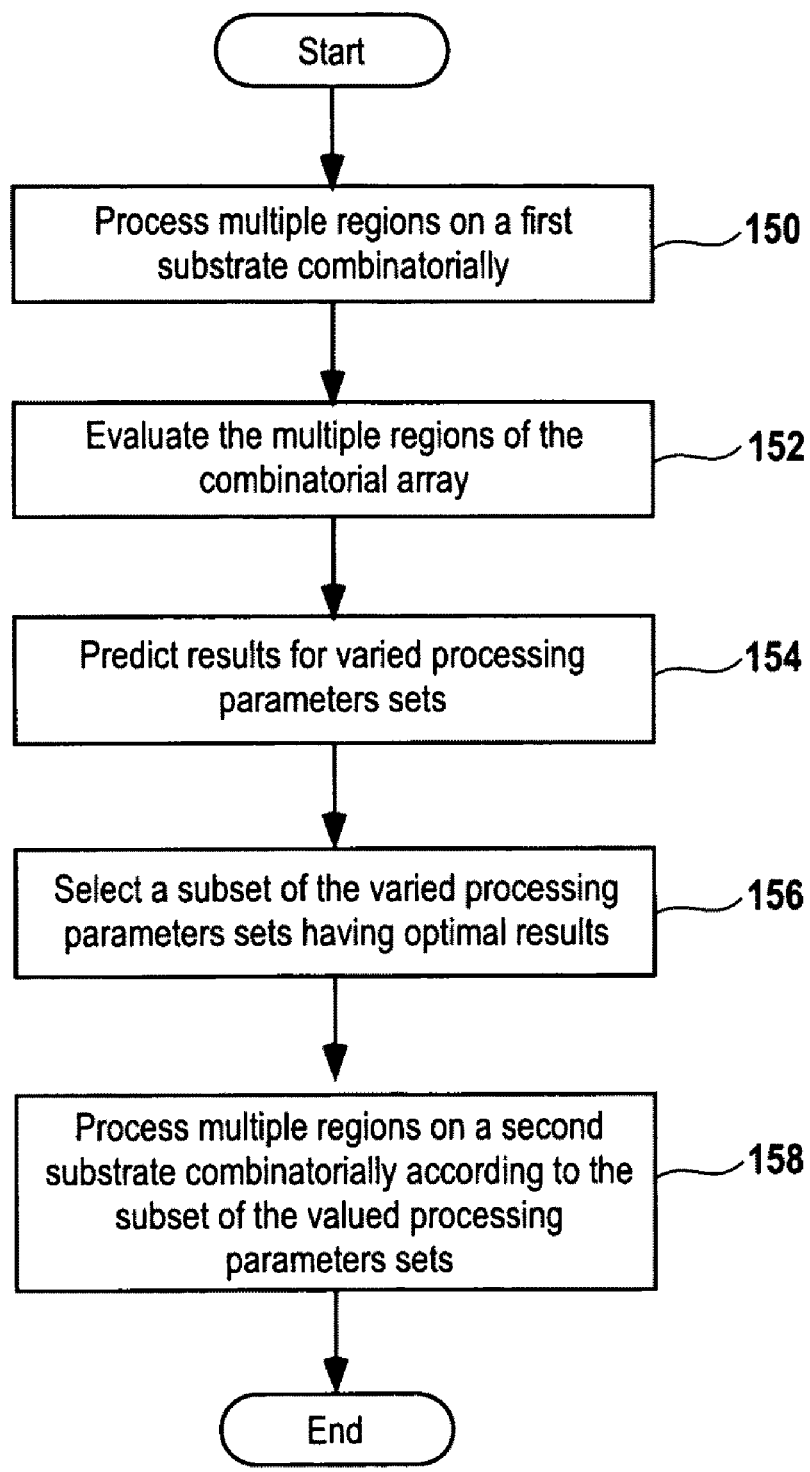
FIG. 2 is a flow chart diagram illustrating method operations for designing experiments for evaluating materials, unit processes, and process sequences for semiconductor substrate manufacturing in accordance with one embodiment of the invention.

FIG. 2 is an alternative flow chart diagram illustrating method operations for designing experiments for evaluating materials, unit processes, and process sequences for semiconductor substrate manufacturing in accordance with one embodiment of the invention. The method initiates with operation 150 where multiple regions on a first substrate are combinatorially processed by varying one of the unit processes, the materials, or the process sequences to define a combinatorial array on the first substrate. It should be appreciated that the combinatorial processing may be a wet or a dry process. The method then advances to operation 152 where the multiple regions of the combinatorial array are evaluated. Here, the multiple regions may be examined for electrical characteristics, physical characteristics, or any other characteristic which is typically tested for a semiconductor substrate. The method then proceeds to operation 154 where the results for varied processing parameter sets are predicted. The varied processing parameter sets are varied from a process parameter set for processing the multiple regions. It should be appreciated that the mathematical model or a model fitting application may be utilized to predict the results for varied processing parameter sets based on the processing parameter set generated from operation 150.

The method of FIG. 2 then advances to operation 156 where a subset of the varied processing parameter sets having optimal results are selected. In one embodiment, the output must be within certain constraints or criteria. This criteria is utilized in selecting a subset having the optimal results. These optimal results will be associated with certain input levels. In operation 158, the multiple regions on a second substrate are processed combinatorially according to the subset of the varied processing parameter sets identified in operation 156. As a result, the focused processing on the second substrate, which was derived from the model generated from the first substrate processing, may arrive at an optimal processing sequence order, unit processes, or materials. In one embodiment, the results from the processing of the second substrate are evaluated against the predicted results to determine the effectiveness of the mathematical model used to predict the results.

FIG. 3A is a simplified schematic diagram illustrating a table of coefficients utilized to provide predicted results in accordance with one embodiment of the invention. In FIG. 3A, a first column of input variables $x_1$-$x_n$ and a corresponding row of output variables $y_1$-$y_n$ are tabulated from a first combinatorial experiment. The first combinatorial experiment yields actual results and from these results model fitting will generate the corresponding coefficients, $a_1$ through $a_{xn}$, which relate the input variables $x_1$-$x_n$ to the output variables $y_1$-$y_n$. In column 300, an input level is selected that is varied from the input level of column 302. From the model fitting, the input level will yield predicted output in section 304. It should be appreciated that the predicted output may have certain constraints or criteria. Thus, the input level can be manipulated so that the predicted output level fits within those constraints or criteria. For example, the output level may be constrained to certain layer thicknesses, electrical properties, and any other suitable properties, which would consequently restrict the input variables to those variables yielding acceptable output levels. The coefficients can relate a single input variable to a corresponding output in one embodiment. For example, where the combinatorial processing is site isolated, this one to one correspondence is provided. In another embodiment, the coefficients may relate multiple input variables to a corresponding output. In this embodiment, a non-site isolated process, e.g., a sputter process, provides a situation where multiple input variables interact to impact the output. Further details on the combinatorial processing may be found in application Ser. Nos. 11/674,132 and 11/674,137, both of which are incorporated by reference for all purposes.

Figure 3B:
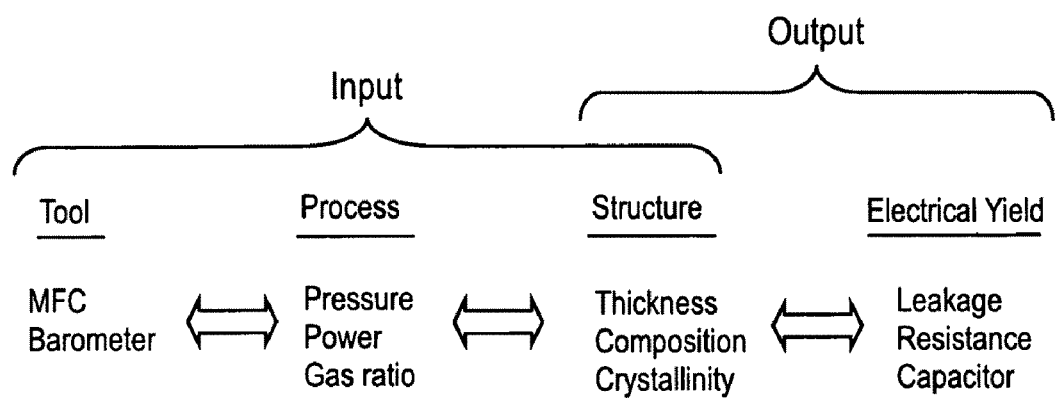
FIG. 3B is a simplified schematic of a table illustrating exemplary relationships between input variables and measurable output parameters in accordance with one embodiment of the invention.

FIG. 3B is a simplified schematic of a table illustrating exemplary relationships between input variables and measurable output parameters in accordance with one embodiment of the invention. The parameters in the exemplary illustration of FIG. 3B include tool parameters, process parameters, structure parameters and electrical/yield parameters. Exemplary tool parameters include mass flow controller and barometer parameters. Exemplary process parameters include pressure, power settings for a processing chamber, and gas ratios for deposition/etching operations. The structural properties include thickness, composition and crystalline properties. It should be appreciated that the structural properties may function as both input and output properties. That is, the structural properties result from tool and process properties but also the electrical/yield properties. Exemplary electrical/yield properties include leakage, resistance, and capacitance.

One skilled in the art will appreciate that the statistical software generates mathematical relationships between input parameters where coefficients representing relationships between the parameters are derived as illustrated in FIG. 3A. The coefficients are used to predict outputs based on selected input parameters. Thus, the desired outputs may be selected through the statistical analysis software. Experiments having input combinations theoretically leading to the desired outputs are selected as leading candidates for future combinatorial processes performed on another substrate. That is, the techniques described herein enable the theoretical exploration of the input parameter space such that a combination of input parameters can be selected in order to provide optimum outputs. The next combinatorial experiment that is actually performed is based on the results of the statistical modeling described herein so that an optimal combination of process sequence order, unit processes, process variables and materials can be identified quicker. That is, through the elimination of combinations not likely to provide the desired results, which are identified through the statistical analysis discussed herein, less actual testing is necessary, thereby streamlining the combinatorial processing time.

Figure 4:
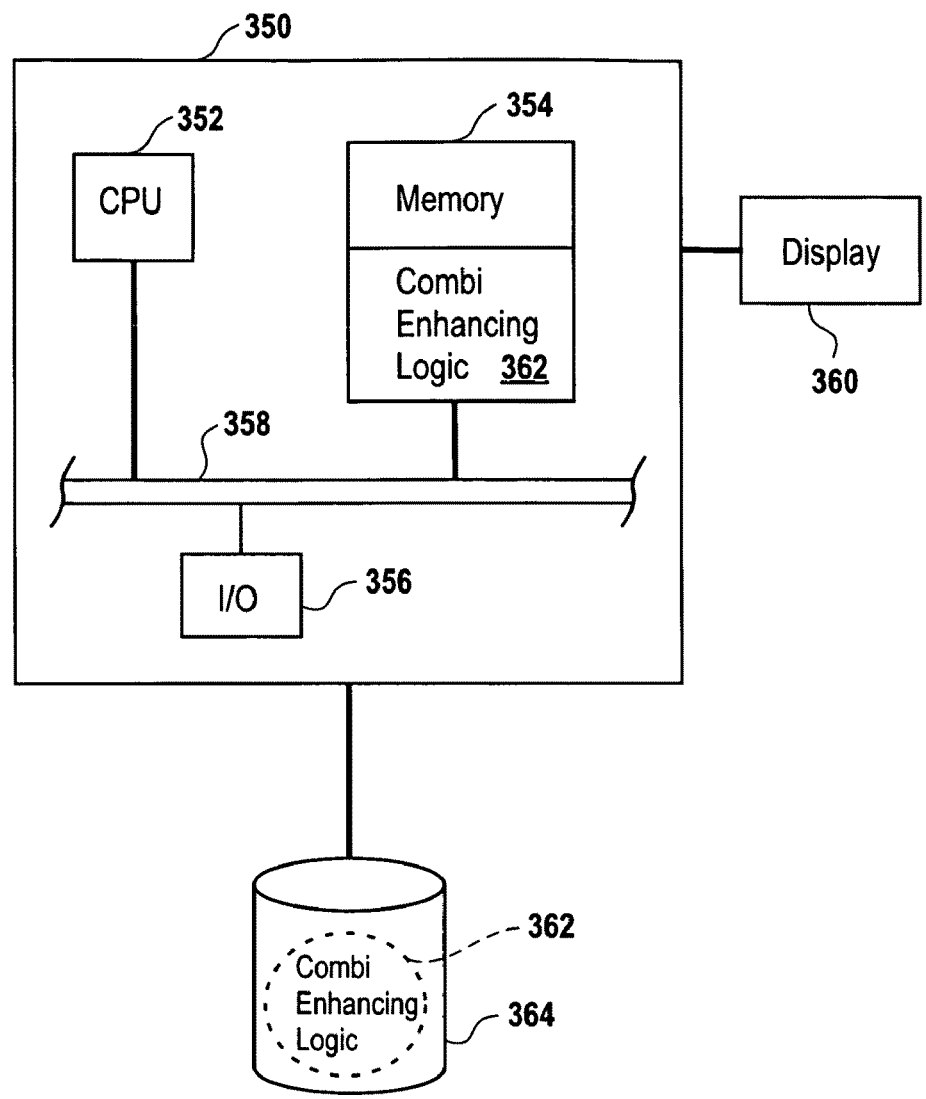
FIG. 4 is a simplified schematic diagram illustrating a system for designing combinatorial experiments for semiconductor manufacturing operations in accordance with one embodiment of the invention.

FIG. 4 is a simplified schematic diagram illustrating a system for designing combinatorial experiments for semiconductor manufacturing operations in accordance with one embodiment of the invention. System 350 includes central processing unit 352, memory 354, and input/output module 356. CPU 352, memory 354, and I/O module 356 are communicatively connected to each other through bus 308. System 350 is also in communication with display 360. In one embodiment, the memory 354 includes program instructions which cause CPU 352 to perform the method operations described above with regard to FIGS. 1 and 2 in one embodiment of the invention. The code for providing this functionality is depicted in memory 354 as combinatorial enhancing logic 362. In an alternative embodiment, a database 364 may house the combinatorial enhancing logic 362. The combinatorial enhancing logic 362 may also be referred to as experiment simulator logic. In addition, either memory 352 or database 364 may store the coefficients derived from the model fitting as well as the model fitting algorithm in accordance with one embodiment of the invention.

Figure 5A:
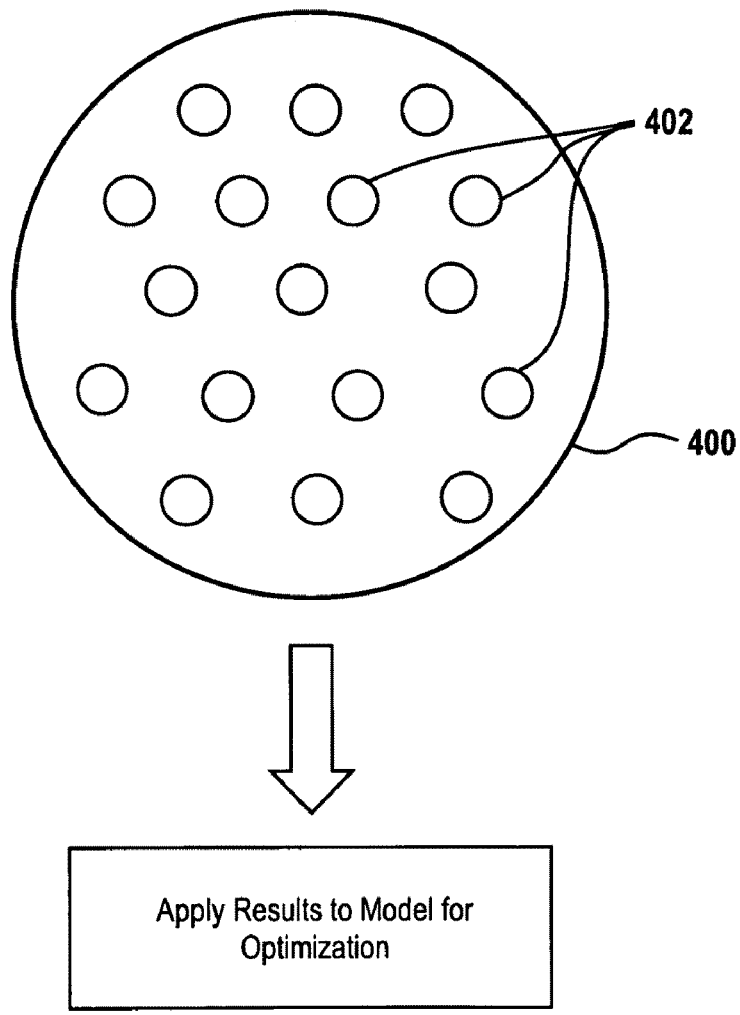
FIGS. 5A-C illustrate one exemplary methodology for designing experiments for evaluating materials, unit processes, and process sequences for semiconductor substrate manufacturing in accordance with one embodiment of the invention.
Figure 5B:
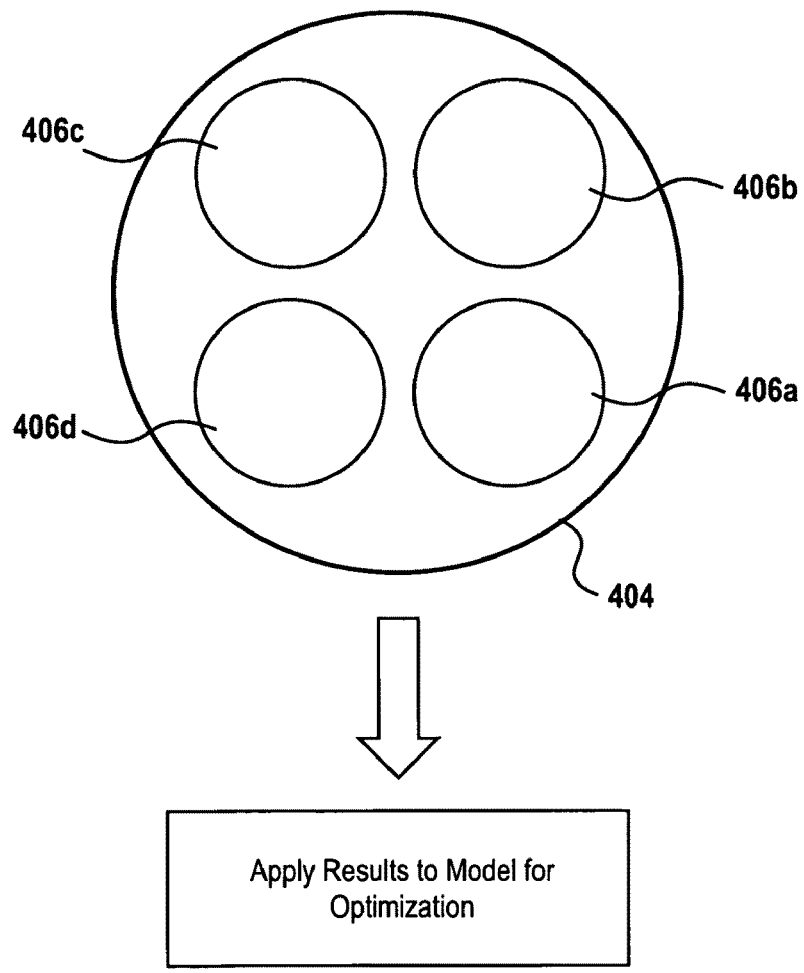
Figure 5C:
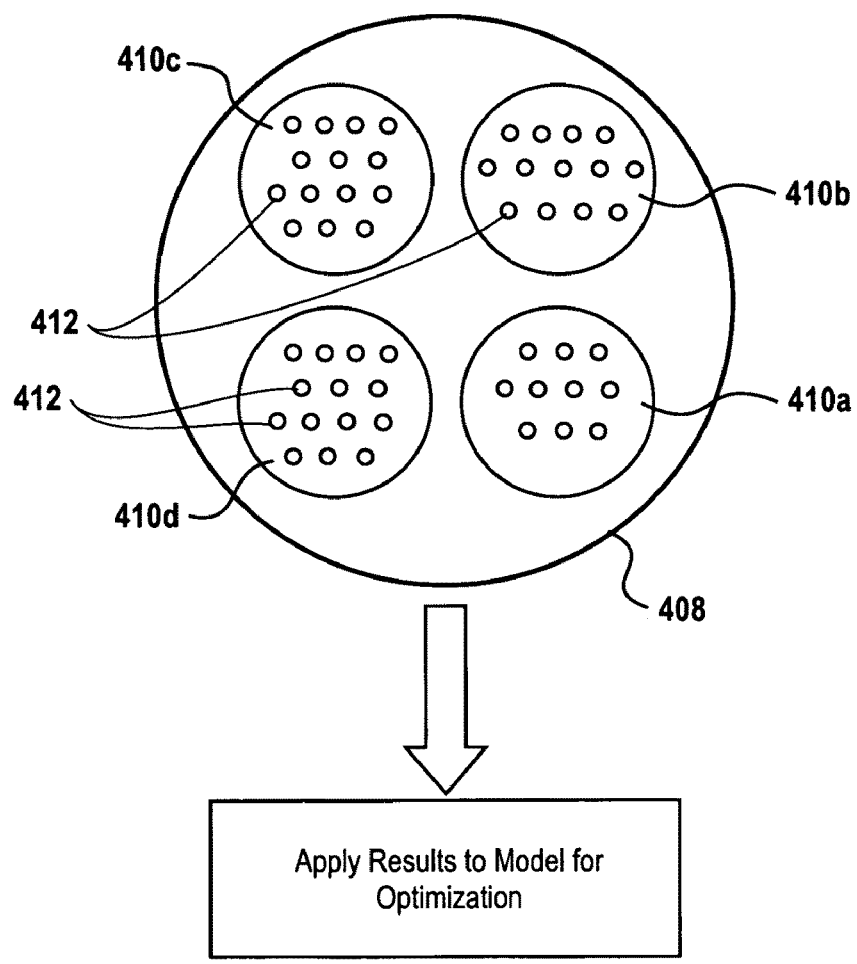

FIGS. 5A-C are simplified schematic diagrams illustrating exemplary methodologies for designing experiments for evaluating materials, unit processes, and process sequences for semiconductor substrate manufacturing in accordance with one embodiment of the invention. In FIG. 5A, an exemplary method of performing combinatorial experiments with a single substrate is illustrated. Substrate 400 includes a plurality of site-isolated regions 402 disposed on a surface of the substrate. With the configuration in FIG. 5A, a single substrate is provided in which process conditions can be varied over the different regions. As a result of varying the process conditions over the different regions 402, results are obtained from a physical model. The results from the physical model can then be applied to the statistical modeling technique described above with reference to FIGS. 1 through 3B in order to derive a predicted output from varying input conditions. In the embodiment of FIG. 5A, the input conditions for processing a single type of substrate are explored in order to provide the desired output.

FIG. 5B is a simplified schematic diagram illustrating an alternative combinatorial method utilizing a plurality of substrates for application of the statistical techniques described above in accordance with one embodiment of the invention. In FIG. 5B, mounting support 404 holds various substrates 406a through 406d. In one embodiment, each of substrates 406a through 406d are different compositions. For example, substrate 406a may be a silicon substrate, substrate 406b may be a platinum substrate, substrate 406c may be a substrate modeling a metal 1 layer, and substrate 406d may be a substrate modeling a metal 2 layer. In this combinatorial experiment, the substrates are varied while the process conditions are kept the same. Through the results of a physical experiment on the substrates of FIG. 5B, the results can be applied to the statistical model described above in order to develop some type of correlation between the input and output parameters for each substrate or between the different substrates to optimize the processing. For example, with regard to an atomic layer deposition (ALD) technique, in one embodiment, the thickness may be unintentionally changed through a second set of physical experiments performed on the substrates of FIG. 5B. Thus, two different physical experiments are performed with some processing condition varied between the two different physical experiments. The parameters are input into the statistical model in order to provide further optimization information.

In one exemplary instance, through the correlation of the thickness and the deposition rate, a statistical model providing suggested optimum processing conditions may be derived. In an alternative embodiment, a deposition process may be performed on each of the different substrates. The results of the deposition may result in the process providing acceptable coverage but unacceptable electrical properties for the deposited film. These results may be applied to the statistical model of FIGS. 3A and 3B in order to explore various input parameters that may be used to predict a desired output. The input parameters predicting a desired output can then be physically tested on the different substrates.

In another embodiment, predicted results from a first physical test may be performed for a second physical test where one of the substrates is further evaluated. For example, after an initial physical test and the corresponding physical and electrical testing on the resulting substrate, further experiments may be performed on one of the substrates which focus on a specific region of the substrate. In particular, with reference to metal 1 substrate 406c, a next physical experiment may focus on some of the structures within substrate 406c, such as vias, trenches, etc. These results can again be evaluated through the statistical modeling in order to suggest further optimized processing conditions.

FIG. 5C is yet another alternative embodiment for the combinatorial processing used in conjunction with the statistical modeling described herein. Mounting support 408 includes a plurality of substrates 410a through 410d. Within substrates 410a through 410d are site-isolated regions 412. It should be noted that the embodiment of FIG. 5C is essentially a combination of the embodiments of FIGS. 5A and 5B. That is, different substrates each having site-isolation and statistical independence are provided in the embodiment of FIG. 5C. Here, combinatorial experiments may be physically performed on substrates 410a through 410d. The results can then be analyzed through the statistical model described herein in order to explore the input parameter space to suggest optimized parameters for running future combinatorial experiments. The embodiments of FIGS. 5A-C allow for the exploration of multiple variables from actual combinatorially generated data without performing the physical experiments. That is, the results of the physical experiment is evaluated through a statistical model in order to reduce future physical experiments and allow the efficient exploration of the input variables for the processing operations.

Figure 6:
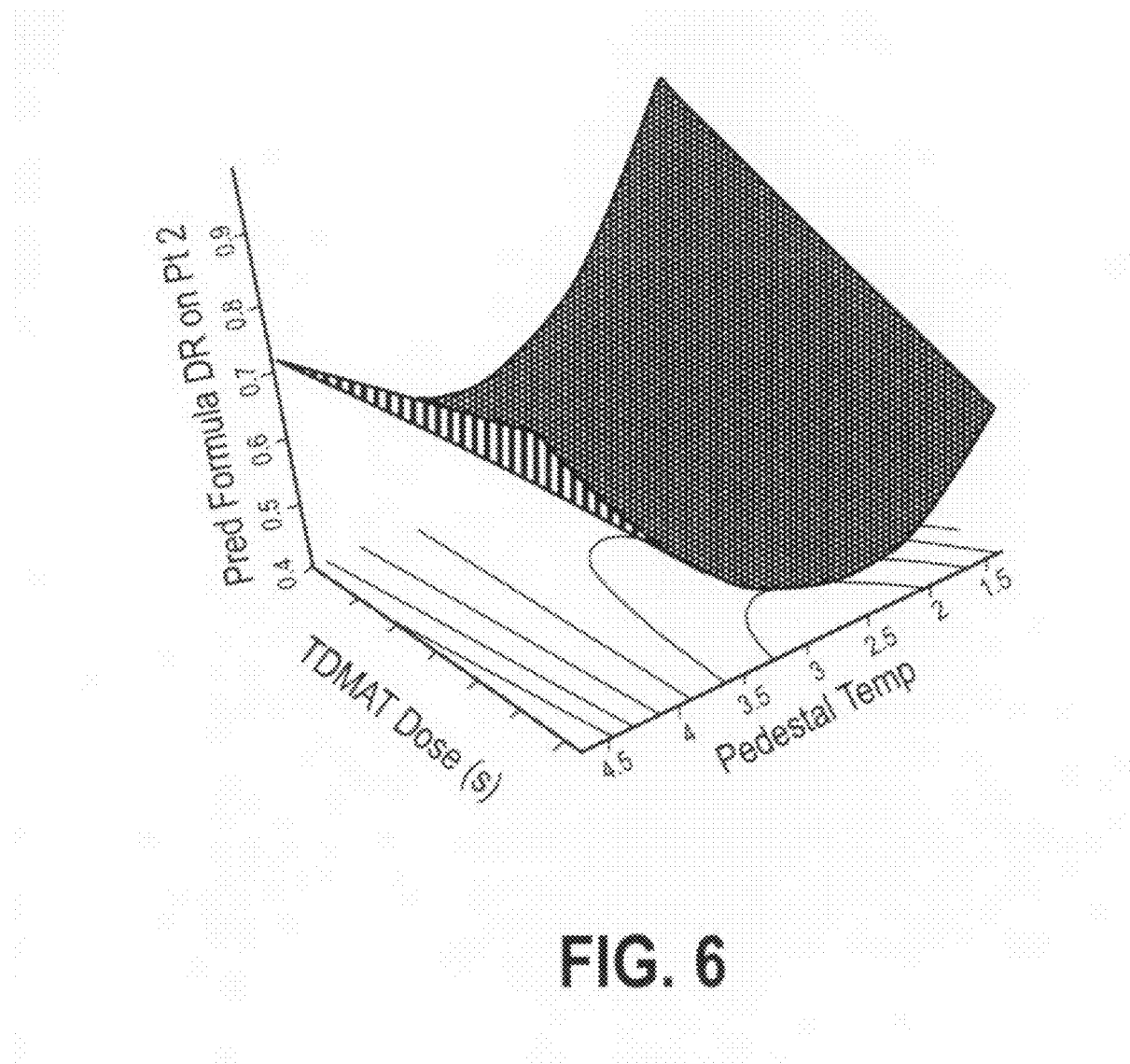
FIG. 6 is a simplified graphical illustration providing a response surface derived through the statistical model described herein in accordance with one embodiment of the invention.

FIG. 6 is a simplified graphical illustration providing a response surface derived through the statistical model described herein in accordance with one embodiment of the invention. The response surface of FIG. 6 provides information on an atomic layer deposition operation where the pedestal temperature and the dose, e.g., percent oxygen, are correlated to the deposition rate. From the graph of FIG. 6, it is shown that at lower pedestal temperatures a significant effect is not perceived on the deposition rate. However, at higher temperatures, the deposition rate is impacted. Thus, through the statistical modeling one skilled in the art will be able to design an experiment utilizing higher pedestal temperatures in order to provide an increased deposition rate if so desired.

Figure 7B:
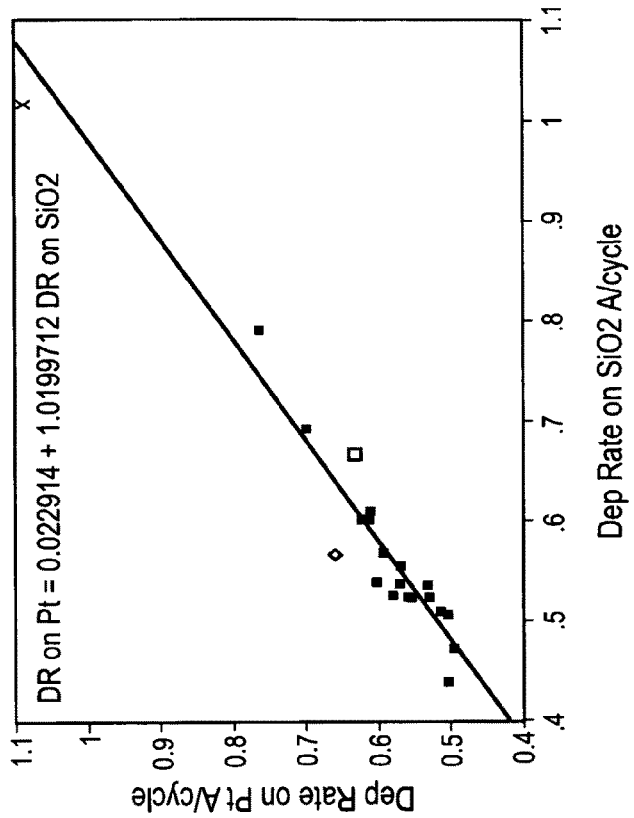
FIGS. 7A and 7B are graphical illustrations illustrating the correlation of deposition rates on different substrate types in accordance with one embodiment of the invention.
Figure 7A:
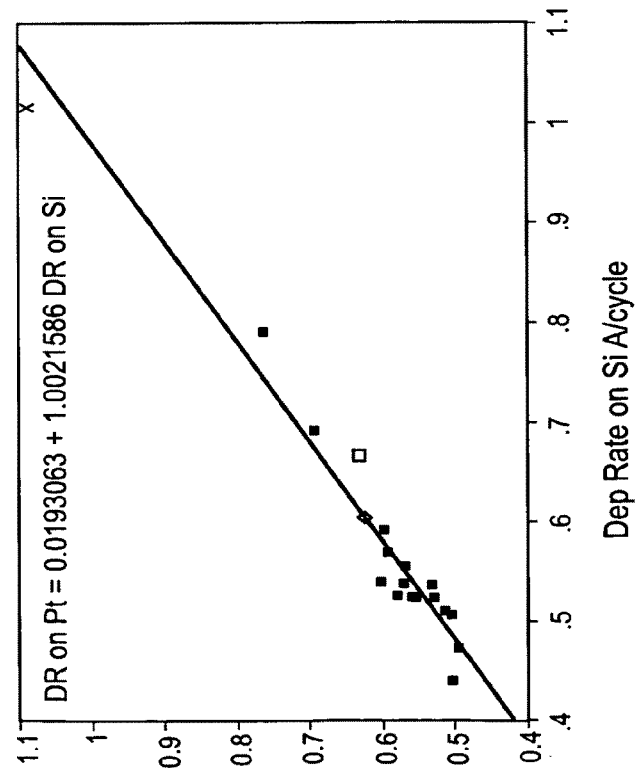

FIGS. 7A and 7B are graphical illustrations illustrating the correlation of deposition rates on different substrate types in accordance with one embodiment of the invention. In one embodiment, different substrates may be analyzed through the embodiments described with reference to FIG. 5B and the correlation of the deposition rates on the different substrates may be utilized so that future experiments can be performed in a more cost-efficient manner. For example, in FIG. 7A the deposition rates on a platinum substrate and a silicon substrate are illustrated. In FIG. 7B, the deposition rates on a platinum substrate and a silicon dioxide substrate are illustrated. As illustrated in each of FIGS. 7A and 7B a linear relationship is derived for the deposition rates on the different substrates. Statistical models can be used to correlate these deposition rates so that future experiments can be performed on a silicon dioxide substrate or silicon substrate and the results correlated to a platinum substrate. Thus, combinatorial processing on a silicon dioxide substrate or silicon substrate for any semiconductor operation, such as depositions, etches, cleans, etc., can be correlated to the processing of a platinum substrate without physically performing the operations on a platinum substrate. With reference to the specific deposition correlations of FIGS. 7A and 7B, data on coverage and electrical testing performed on silicon or silicon dioxide substrates can be correlated to deposition results on a platinum film. In one embodiment, in order to confirm the correlation the processing operation may be performed on a platinum substrate to provide physical proof of the statistically derived correlation.

Through the embodiments described herein an optimized process solution is derived at a lowest cost. Initially a statistical design of experiment is executed in a high performance combinatorial manner. Here, multiple regions of a substrate are processed differently to mimic conventional full wafer processing. For example, a five variable response surface design (33 runs) can be run on a 300 mm substrate utilizing high performance combinatorial techniques. A response surface model for each individual output response from the high performance combinatorial processing is built through statistical analysis software, such as JMP™. In one embodiment, the model building is performed by successive iterations of reducing the model terms while ensuring normal, random and unbiased residuals. The models are statistically significant and through linear optimization viable options are identified and non-viable options are culled. A process solution is built by optimizing the input parameters such that all of the output response predictions meet pre-determined criteria or restraints.

It should be appreciated that combinatorial processing applied to semiconductor manufacturing operations assists in arriving at a globally optimal sequence of semiconductor manufacturing operations. The globally optimum sequence is arrived at by considering interaction effects between the unit manufacturing operations, the process sequence of the unit manufacturing operations, the process conditions used to effect such unit manufacturing operations, as well as materials characteristics of components utilized within the unit manufacturing operations. The embodiments described herein provide details for enhancing the multi-region processing system and associated reaction chambers that enable processing a substrate in a combinatorial fashion. In one embodiment, the different regions are isolated (e.g., 'site-isolated') so that there is no interdiffusion between the different regions.

According to some embodiments described herein, the processing may take place over structures formed on the semiconductor substrate, which are equivalent to the structures formed during actual production of the semiconductor device. For example, structures may include, but not be limited to, trenches, vias, interconnect lines, capping layers, masking layers, diodes, memory elements, gate stacks, transistors, or any other series of layers or unit processes that create a structure found on semiconductor chips. In addition, the combinatorial processing of the substrate may be combined with conventional processing techniques where substantially the entire substrate is processed, e.g., most or all of the regions of the substrate are subjected to the same materials, unit processes, and process sequences. Thus, the embodiments described herein can pull a substrate from a manufacturing process flow, perform combinatorial processing, and return the substrate to the manufacturing process flow for further processing. Alternatively, a substrate can be processed in an integrated tool that allows both combinatorial and conventional processing in various chambers attached around the central chamber.

The present invention provides greatly improved methods and apparatus for the differential processing of regions on a single substrate. It is to be understood that the above description is intended to be illustrative and not restrictive. Many embodiments and variations of the invention will become apparent to those of skill in the art upon review of this disclosure. Merely by way of example a wide variety of process times, process temperatures and other process conditions may be utilized, as well as a different ordering of certain processing steps. The scope of the invention should, therefore, be determined not with reference to the above description, but instead should be determined with reference to the appended claims along with the full scope of equivalents to which such claims are entitled.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Also, programs that implement various aspects of this invention may be accessed from a remote location (e.g., a server) over a network. Such data and/or programs may be conveyed through any of a variety of machine-readable medium. Machine-readable medium are divided into two groups, one being storage medium and the other being transmission medium. Transmission medium includes any other suitable electromagnetic carrier signals including infrared signals. Examples of storage medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

The present invention may be conveniently implemented with software. However, alternative implementations are certainly possible, including a hardware and/or a software/hardware implementation. Any hardware-implemented functions may be realized using ASIC(s), digital signal processing circuitry, or the like. The term "machine-readable medium" as used herein includes software, hardware having a program of instructions hardwired thereon, or a combination thereof. With these implementation alternatives in mind, it is to be understood that the figures and accompanying description provide the functional information one skilled in the art would require to write program code (i.e., software) or to fabricate circuits (i.e., hardware) to perform the processing required.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for evaluating materials, unit processes, and process sequences for a semiconductor manufacturing process, comprising:
   performing a first set of tests in a combinatorial manner according to corresponding input variables in order to evaluate material properties on a first substrate;
   inputting results of the first set of tests and the corresponding input variables into a mathematical model to derive coefficients relating the input variables to the results;
   defining sets of varied input variables;
   combining sets of the varied input variables with the coefficients to derive a predicted output for each of the sets;
   selecting a portion of the sets of the varied input variables; and
   performing a second set of tests in a combinatorial manner according to the portion of the sets of the varied input variables on a second substrate.

2. The method of claim 1 wherein the first set of tests are performed in a site isolated manner.

3. The method of claim 1, wherein the first set of tests are performed in a non-site isolated manner.

4. The method of claim 1, wherein performing the first set of tests in a combinatorial manner includes varying one of the process sequences, the unit processes or the materials.

5. The method of claim 1, wherein one of the coefficients represents a relationship between a single input variable and a corresponding output.

6. The method of claim 1, wherein one of the coefficients represents a relationship between multiple input variables and a corresponding output.

7. The method of claim 1, wherein the varying of the input variables is limited according to output ranges.

8. The method of claim 1, further comprising:
correlating one of the first and the second set of tests to a third substrate, the third substrate differing from both the first and the second substrates.

9. A method for designing experiments for evaluating materials, unit processes, and process sequences for semiconductor substrate manufacturing, comprising:
processing multiple regions on a first substrate combinatorially by varying one of the unit processes, the materials, or the process sequences thereby defining a combinatorial array on the first substrate;
evaluating the multiple regions of the combinatorial array;
predicting results for varied processing parameter sets, the varied processing parameter sets varied from a processing parameter set for processing the multiple regions;
selecting a subset of the varied processing parameter sets having optimal results; and
processing multiple regions on a second substrate combinatorially according to the subset of the varied processing parameter sets.

10. The method of claim 9, wherein the varied processing parameter sets are constrained by the results.

11. The method of claim 9 wherein predicting the results further comprises:
generating structural results from the varied processing parameter sets, wherein the predicted results are derived from the structural results.

12. The method of claim 9 wherein the processing multiple regions on a first substrate is performed such that each of the regions is processed with a local uniformity.

13. The method of claim 9, wherein regions of the first substrate are smaller than regions of the second substrate.

14. The method of claim 9, further comprising:
verifying results of the processing on the second substrate by comparing the results of the processing on the second substrate with the optimal results.

15. The method of claim 9, wherein the predicting results for the varied processing parameter sets comprises;
generating coefficients relating input parameters for processing multiple regions on the first substrate and corresponding output parameters from the evaluating.

16. The method of claim 9, wherein the first substrate and the second substrate are composed of different materials.

17. A computer implemented system for designing combinatorial experiments for semiconductor manufacturing operations, comprising:
a bus;
a memory;
a processor in communication with the memory through the bus, the processor operable to receive instructions which, when executed by the processor, cause the processor to perform a method comprising:
receiving both input parameters for combinatorial processing operations and results of the combinatorial processing;
generating coefficients relating the input parameters and the results;
varying the input parameters;
combining varied input parameters with the generated coefficients to derive predicted results for processing under the varied input parameters; and
verifying the predicted results based on further combinatorial processing according to the varied input parameters.

18. The system of claim 17, wherein the input parameters and the results are for multiple regions of a single substrate with processing conditions varied between the multiple regions.

19. The system of claim 17, wherein the input parameters and the results are for different composition substrates with processing conditions substantially similar between the substrates.

20. The system of claim 17, wherein the verifying is performed on a substrate having a different composition than a substrate from which the input parameters for the combinatorial processing were derived.

* * * * *